United States Patent
Klabunde et al.

(10) Patent No.: US 11,790,095 B2
(45) Date of Patent: Oct. 17, 2023

(54) DYNAMICALLY MODIFYING FUNCTIONALITY OF A REAL-TIME COMMUNICATIONS SESSION

(71) Applicant: KONINKLIJKE PHILIPS N.V., Eindhoven (NL)

(72) Inventors: Karin Klabunde, Bochum (DE); Zoran Stankovic, Eindhoven (NL); Arjan Michiel Draisma, Eindhoven (NL); Marcel Johannes Quist, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 3 days.

(21) Appl. No.: 17/617,353

(22) PCT Filed: Jun. 11, 2020

(86) PCT No.: PCT/EP2020/066157
§ 371 (c)(1),
(2) Date: Dec. 8, 2021

(87) PCT Pub. No.: WO2020/249653
PCT Pub. Date: Dec. 17, 2020

(65) Prior Publication Data
US 2022/0229919 A1 Jul. 21, 2022

Related U.S. Application Data

(60) Provisional application No. 62/860,503, filed on Jun. 12, 2019.

(30) Foreign Application Priority Data

Nov. 8, 2019 (EP) ...................................... 19208079
Dec. 4, 2019 (EP) ...................................... 19213555

(51) Int. Cl.
H04L 65/1089 (2022.01)
G06F 21/62 (2013.01)
H04L 65/1069 (2022.01)

(52) U.S. Cl.
CPC .......... *G06F 21/62* (2013.01); *H04L 65/1069* (2013.01); *H04L 65/1089* (2013.01)

(58) Field of Classification Search
CPC . G06F 21/62; G06F 17/27; G06F 3/14; H04L 65/1069; H04L 65/1089
(Continued)

(56) References Cited

U.S. PATENT DOCUMENTS 9,787,835 B1 10/2017 Pycko
10,347,293 B1 7/2019 Skinner
(Continued)

FOREIGN PATENT DOCUMENTS

WO WO2020249645 A1 12/2020

OTHER PUBLICATIONS

International Search report and Written Opinion from PCT/EP2020/066157 dated Aug. 25, 2020.

*Primary Examiner* — Glenford J Madamba (57) ABSTRACT

The invention discloses a method for modifying functionality of a real-time communications system. The method comprises establishing a real-time communication session (100) between a first participant (A) and a second participant (B); responsive to detecting a trigger event, selecting a first redaction algorithm (112) of a plurality of redaction algorithms; and adding the first redaction algorithm to the real-time communication session as a virtual participant (C). The first redaction algorithm is configured to redact data appearing in a data stream to be transmitted from the first participant to the second participant during the real-time communication session.

16 Claims, 4 Drawing Sheets

(58) Field of Classification Search
USPC .......................................................... 709/204
See application file for complete search history.

(56) References Cited

U.S. PATENT DOCUMENTS

| | | |
|---|---|---|
| 2004/0133625 A1 | 7/2004 | Plessmann |
| 2007/0153091 A1 | 7/2007 | Watlington |
| 2013/0093829 A1 | 4/2013 | Rosenblatt |
| 2014/0204190 A1 | 7/2014 | Rosenblatt, III |
| 2017/0011233 A1 | 1/2017 | Xue |
| 2017/0026516 A1* | 1/2017 | Westlake ............ H04M 3/5183 |
| 2017/0178234 A1* | 6/2017 | Jezek, Jr. ............... G06Q 40/04 |
| 2017/0200021 A1 | 7/2017 | Patel |
| 2019/0013038 A1* | 1/2019 | Thomson ................ G06F 40/20 |

\* cited by examiner

DYNAMICALLY MODIFYING FUNCTIONALITY OF A REAL-TIME COMMUNICATIONS SESSION

CROSS REFERENCE TO RELATED APPLICATIONS

This application is a U.S. national phase application of International Application No. PCT/EP2020/066157 filed on Jun. 11, 2020, which claims priority to U.S. provisional application Ser. No. 62/860,503, filed Jun. 12, 2019, and which also claims the benefit of European Patent Application No. EP19208079.4, filed on Nov. 8, 2019 and European Patent Application No. EP19213555.6, filed on Dec. 4, 2019. These applications are incorporated herein by reference.

FIELD OF THE INVENTION

The invention relates to Real-Time Communications (RTC) and, more particularly, to modifying functionality of real time communications systems.

BACKGROUND OF THE INVENTION

Real-Time Communications (RTC) is the near simultaneous exchange of information over any type of telecommunications service from a sender to a receiver in a connection with low or even negligible latency. Examples of RTC typically employ real-time data streams (e.g. video, voice and/or data streams) and include: voice over landlines and mobile phones; VoIP; Video and teleconferencing; chat; and Robotic telepresence. Accordingly, RTC does not include email, bulletin boards, messaging applications, blogs or other forms of internet communication where users read stored content, which can create a significant delay between data transmission and reception. RTC is typically not stored in an interim state anywhere between the transmitter and the receiver. Within that context, "real-time communications" may be thought of as a synonym for "live communications".

One potential problem with transmitting communication data in real time that there is little time to review the data prior to transmission, so that any portions of data that should not be transmitted can be removed. An example of an application of real-time communications is in the medical field, where data relating to or identify a patient may be transmitted between parties of an RTC session. Patient confidentiality (e.g. patient anonymity) is of particular importance, especially if one or more of the parties involved in the RTC session should not have access to particular data, such as data relating to the patient.

Therefore, there is a need for a means by which some data that is to be transmitted during an RTC session can be identified and then restricted or removed from a data stream before it is transmitted to one or more participants of the RTC session.

SUMMARY OF THE INVENTION

Real-time communication is particularly beneficial in situations where a response to a query is required immediately, when slower means of communication (e.g. email or messages through a messaging application) are unsuitable. However, as noted above, ensuring that sensitive data is not communicated to an intended recipient during an RTC session can pose significant difficulties, as less time is available to identify and redact the relevant sensitive data.

The inventors have recognized suitable data redaction may be performed using one or more algorithms which are configured to process data in a data stream, to identify any data that should be redacted, and to perform suitable redaction techniques so that the identified data is not transmitted to a participant of the RTC session who should not receive the data.

According to a first aspect, the present invention provides a method for modifying functionality of a real-time communications system, the method comprising establishing a real-time communication session between a first participant and a second participant; responsive to detecting a trigger event, selecting a first redaction algorithm of a plurality of redaction algorithms; and adding the first redaction algorithm to the real-time communication session as a virtual participant. The first redaction algorithm is configured to redact data appearing in a data stream to be transmitted from the first participant to the second participant during the real-time communication session.

Implementing a redaction algorithm in this way, enables a suitable algorithm to be selected, in real time, based on the type of data stream being communicated and based on the nature of the content of the data stream. Thus, rather than selecting mechanism for adapting data in the data stream prior to the RTC session beginning, as was the case with previous RTC systems, the mechanism disclosed herein allows for dynamic implementation of suitable redaction technique appropriate to the nature of the data being communicated, and at an appropriate time.

In some embodiments, the method may further comprise, responsive to adding the first redaction algorithm to the real-time communication session, transmitting the data stream to the first redaction algorithm. The method may further comprise redacting data in the data stream. The method may further comprise transmitting a redacted data stream to the second participant. Thus, in some embodiments, the methods disclosed herein may be considered to be methods of redacting data in a real-time communications system.

In this way, data streams that are to be redacted are not transmitted directly from the first participant to the second participant; rather, they are directed via the algorithm selected for performing the redaction of sensitive data.

The method may further comprise determining, after a defined duration or in response to an indication, whether redaction of the data stream is to be continued. Responsive to determining that redaction of the data stream is not to be continued, the method may comprise removing the first algorithm as a virtual participant to the real-time communication session, such that the data stream is transmitted directly from the first participant to the second participant. This may help to reduce latency of lag, as the data stream is not sent via the first algorithm when processing (e.g. to redact data) is not required.

In some embodiments, the method may further comprise determining an amount by which content in the data stream changes within a defined duration. Responsive to determining that the content in the data stream has changed by at least a defined threshold amount within the defined duration, the method may comprise continuing to redact the data stream using the first redaction algorithm. However, responsive to determining that the content in the data stream has changed by less than the defined threshold amount within the defined duration, the method may comprise transmitting the data stream directly from the first participant to the second participant, and transmitting a redaction mask from the first algorithm to the second participant. In this way, if a previously-generated redaction means (e.g. a mask) can be used for a data stream that has not changed, then it will be. This can again reduce lag as further processing by the algorithm (e.g. to analyze the data stream and redact sensitive data) is not required.

The method may, in some embodiments, comprise, responsive to detecting a further trigger event, selecting a second redaction algorithm of the plurality of redaction algorithms. The method may comprise adding the second redaction algorithm to the real-time communication session as a virtual participant. The second redaction algorithm may be configured to redact data appearing in the data stream during the real-time communication session.

In some embodiments, the first redaction algorithm is one of a plurality of redaction algorithms stored in an algorithm management module.

Each of the plurality of redaction algorithms may be configured to redact sensitive data or patient confidential data from a data stream to be transmitted from the first participant to the second participant during the real-time communication session.

The data stream may comprise at least one of an audio data stream, a video data stream, a textual data stream and a display screen-sharing data stream.

In some embodiment, the trigger event may comprise an event selected from a set of events comprising: detecting the performance of a defined action; detecting the initiation of an RTC session; detecting the initiation of a defined type of data stream sharing; and detecting a defined type of data in a data stream to be transmitted as part of the RTC session.

In some embodiments, the first participant may comprise a medical professional. The real-time communication may be configured for exchange of information relating to medical device support, exchange of clinical information relating to clinical decision support, or exchange of information relating to computer application support.

The method may, in some embodiments, further comprise extracting, from the data stream, contextual information relating to the nature of the real-time communication session. The method may comprise determining, based on the extracted contextual information, data to be redacted from the data stream.

Contextual information can help to improve the effectiveness of the redaction algorithm. For example, by using contextual information relating to the RTC session, it may be possible to predict in advance that particular sensitive data is likely to be disclosed and, therefore, action to redact the data may be taken quickly.

In some examples, determining data to be redacted from the data stream may comprise predicting, based on the extracted contextual information, the occurrence of an event during the real-time communication session that will contain data that is to be redacted.

According to a second aspect, the present invention provides an apparatus for modifying functionality of a real-time communications system. The apparatus comprises a processor configured to detect a trigger event associated with a data stream to be transmitted from a first participant of a real-time communication session to a second participant of the real-time communication session. The processor is further configured to responsive to detecting the trigger event, initiate a first redaction algorithm. The processor is further configured to receive the data stream from the first participant. The processor is further configured to apply the first redaction algorithm to redact a portion of data appearing in the received data stream. The processor is further configured to transmit a redacted data stream to the second participant.

The processor may be further configured to determine an amount by which content in the data stream changes within a defined duration. The processor may be further configured to responsive to determining that the content in the data stream has changed by at least a defined threshold amount within the defined duration, continue to apply the first redaction algorithm to redact a portion of data appearing in the data stream. The processor may be further configured to responsive to determining that the content in the data stream has changed by less than the defined threshold amount within the defined duration, stop receiving the data stream from the first participant, and transmit a redaction mask to the second participant to be applied to the data stream.

According to a third aspect, the present invention provides a computer program product comprising a non-transitory computer-readable medium, the computer readable medium having computer-readable code embodied therein, the computer-readable code being configured such that, on execution by a suitable computer or processor, the computer or processor is caused to perform steps of the methods disclosed herein.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF EMBODIMENTS

Examples described herein provide a mechanism by which functionality of an RTC session between multiple participants can be adapted to introduce additional functionality capable of redacting a portion of data in a data stream that is to be transmitted as part of the RTC session. The additional functionality may be introduced in the form of a redaction algorithm that is added as a virtual participant in the RTC session. For example, during an RTC session between two parties, a data stream being transmitted between the parties may contain some sensitive or confidential data which one of the parties is not authorized to receive. According to various embodiments, it may be recognized that the data stream includes such sensitive data, and a redaction algorithm may be called or activated that is configured to redact the sensitive data from the data stream, so that the receiving party receives a redacted version of the data stream (i.e. with the sensitive data removed or obscured in some way), rather than the original data stream that contains the sensitive data.

In embodiments described herein, a data stream may comprise data or content capable of being transmitted between a sending/transmitting party and a receiving party. The data stream may comprise one or more of an audio data stream, a video data stream, a textual data stream and a display screen-sharing data stream. An audio data stream may comprise sounds, such as the voices of one or more of the participants of the RTC session taking part in a conversation. The audio data stream may, for example, be in one of a variety of known standard audio formats, such as OPUS. A video data stream may comprise video footage (e.g. live video footage), including a stream of images/frames captured using an image capture device, such as a camera. The video stream may, for example, be captured according to one of a variety of known standards, such as the H.264 video format. A textual data stream may comprise a series of alphanumeric letters, words, sentences, and the like, transmitted as part of a conversation, for example. A display screen-sharing data stream (sometimes referred to as a screen-share) may comprise a screen-grab or screen-capture of a display device, such as a computer display screen or a display screen of a machine or piece of equipment. The screen-share may be updated periodically (e.g. in real time) to enable the receiving party to view the display screen of the sending party. The data stream may, in other example, comprise arbitrary data (e.g. not in any of the above-described forms). For example, a first name and a surname of a patient may be transmitted in some arbitrary format as part of a data stream, and this may be redacted. In another example, a number representative or indicative of a birth year may be transmitted and redacted from a data stream. Examples herein are described in the context of the types of data streams discussed above, but it will be understood that other types of data streams are also covered.

Some examples herein are described in the context of a medical setting. For example, the RTC session may be established to enable a person (i.e. a first participant of the RTC session) to communicate with a remote support agent (e.g. a person located remote from the first participant, and who becomes a second participant of the RTC session). The support agent may, for example, provide advice to the first participant. The support agent may, for example, be: i) a technical support agent who is able to provide technical support regarding a device or a machine (e.g. a medical device); ii) a clinical decision support agent who is able to provide support regarding a medical or clinical situation (e.g. for assistance with making a clinical diagnosis); or iii) a computer application support agent who is able to provide support regarding a computer program, a computer application or a user interface generated or used as part of a computer application. In general, the support agent may be called upon to provide advice or support regarding a particular situation, but the support agent may not be authorized to view or know particular information (e.g. sensitive data) that may be disclosed in a data stream communicated to the support agent during the RTC session. Thus, the invention disclosed herein enables such information to be identified and redacted prior to receipt by the support agent.

The invention may alternatively be implemented in a non-medical setting. For example, embodiments of the invention may be applied to a scenario where a support agent is to provide advice or support to a business or company. Data in a data stream sent by the company to the support agent (e.g. information visible in a screen-share) during an RTC session may be sensitive or confidential (e.g. salary information or confidential information relating to staff members) and the invention may enable such data to be redacted prior to the data stream being received by the support agent.

Figure 1:
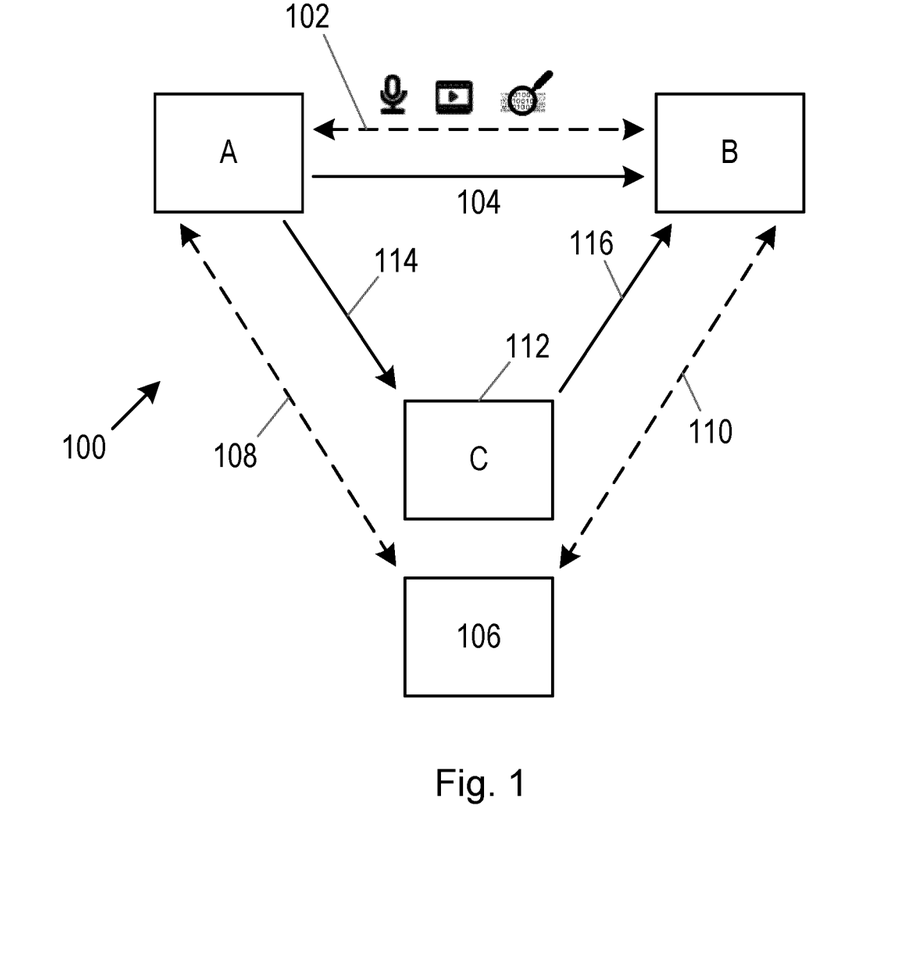
FIG. 1 is a schematic illustration of an example of an RTC session according to various embodiments.

Referring to the drawings, FIG. 1 is a schematic illustration of an example of an RTC session 100. The RTC session 100 is a multi-party RTC session, in which multiple parties may participate. In this example, the RTC session 100 involved a first participant A and a second participant B. Participants A and B exchange data via a communication link 102. The data may be exchanged in data streams comprising audio, video and/or other data, such as images forming a screen-sharing session, and is depicted in FIG. 1 by corresponding symbols. As noted above, other types of data may also be exchanged in an RTC session.

The RTC session 100 may be initiated by participant A sending a session/call initiation message to participant B via the link 102 and, in response, participant B acknowledging or accepting the request, and joining the session by sending an acceptance/joining message to participant A via the link 102. In this example, participant A initiates, or generates an intention to initiate, the sharing of a particular type of data, such as a live screen-sharing session, indicated by the solid line 104. For example, participant A may wish to share their computer screen so that participant B can provide assistance or support regarding a computer application or a user interface displayed on the screen. A signal or message generated by participant A when the screen-share session is initiated acts as a trigger that potentially confidential information may be transmitted from participant A to participant B. The trigger may be detected or received by an RTC management module 106 which may provide or enable the RTC session 100, and may manage such sessions between the various participants. The RTC management module 106 may be implemented using application logic.

In this example, the RTC management module 106 is in communication (or is capable of communicating) with participant A via a communication link 108, and is in communication (or is capable of communicating) with participant B via a communication link 110. Upon detecting or receiving the trigger indicating that screen-sharing is to begin, the RTC management module 106 calls or activates an algorithm to redact any sensitive/confidential information from the data stream (i.e. the images of the screen being shared). The algorithm that is called may be one of a plurality of algorithms stored in an algorithm management module (not shown in FIG. 1) or an algorithm storage module forming part of or associated with the RTC management module 106. A selection of an appropriate algorithm is made based on the participants, the nature of the RTC session, the nature of the data stream being shared, or intended to be shared, and the like. In this example, the RTC management module 106 may select an algorithm 112 capable of identifying and redacting sensitive or confidential data in a screen-share data stream. In some embodiments, multiple algorithms or a combination of algorithms may be appropriate, and may therefore be selected by the RTC management module 106.

The selected algorithm 112 is added as a participant C to the RTC session 100. When multiple algorithms are selected, each algorithm may be added as a separate participant to the RTC session. An algorithm added as a participant may be considered to be a virtual participant. Once the selected algorithm 112 has been added to the RTC session 100, a screen-share data stream from participant A is transmitted to the newly-added participant C, in a data exchange indicated by the solid line 114. The algorithm 112 then analyzes the data stream to determine whether or not the screen-share data stream includes any data that is considered to be confidential or sensitive and which should be redacted. Various algorithms exist that are suitable for identifying sensitive data within a data stream and redacting any identified sensitive data. Some algorithms may be more suited for identifying sensitive data in particular types of data streams; for example, some algorithms may be particularly suited for identifying sensitive data in video data streams, while other algorithms may be particularly suited for identifying sensitive data in a screen-share data stream. Similarly, algorithms may be configured to identify particular types of data within a data stream. For example, some algorithms may be particularly suited for identifying textual data appearing in a data stream, while other algorithms may be particularly suited for performing facial recognition to identify particular people appearing in a data stream. Thus, the identification reduction of sensitive data from a data stream may be performed by a combination of algorithms working together.

Once the selected algorithm 112 has received the data stream via a data exchange 114, the algorithm performs its intended function(s) on the data stream (i.e. identifying and/or redacting any sensitive data or content), then may send a redacted data stream to the participant B via a data exchange indicated by the solid line 116. Thus, the participant be receives the redacted data stream which comprises a version of the original data stream transmitted by the participant A, with any sensitive data having been removed or redacted.

According to various implementations, the redaction of a data stream may be achieved in various ways. In a first example (i.e. the example shown in FIG. 1), the data stream is sent from participant A to the algorithm 112, then, once data has been redacted (e.g. removed, blurred, obfuscated, or the like) from the data stream, the redacted data stream is sent by the algorithm to participant B. In a second example, the data stream is sent from participant A to the algorithm 112, then, once data has been redacted from the data stream, the redacted data stream may be sent back to participant A, and then sent to participant B. In this example, participant A is able to view the redacted data before it is transmitted to participant B, giving more control to participant A, and providing more certainty and confidence that any sensitive data has been removed prior to transmission to participant B. In a third example, the data stream is sent from participant A to the algorithm 112, then, once data has been redacted from the data stream, the redacted data stream may be sent to both participant A and participant B In this way, participant A is able to view exactly what has been sent to participant B. In a fourth example, the data stream is sent from participant A to the algorithm 112, and a mask (e.g. a redaction means, such as an image, opaque block, white noise, blurred region, or the like) capable of obscuring sensitive data in the data stream is sent from the algorithm 112 to participant B. The original data stream is sent directly from participant A to participant B, but prior to being presented to participant B, the mask generated and sent by the algorithm 112 is applied to the data stream, such that participant B is presented with only the redacted data stream. Several of these examples are discussed in greater detail below.

As used herein, the term "redacting" is intended to cover any type of covering, removing or hiding including, for example, obfuscating, obscuring, masking blurring, blanking out, covering, deleting or removing.

For example, in an audio data stream, audio data that discloses sensitive or confidential information may be removed altogether or covered by some other sound (e.g. white noise) so that the original sound becomes inaudible. In some examples, a redaction algorithm may scan an audio stream and, if it is detected that a patient's details (e.g. name, address, date of birth, and so on) are mentioned, then the relevant part of the audio stream is removed, distorted or replaced by a different sound. In another example, speech may be altered or distorted in such a way that the speaker cannot easily be recognized. An audio data stream may be recorded and analyzed in blocks (e.g. in 5 second blocks), or in real-time (e.g. in smaller blocks of say 0.5 seconds). Speech may be analyzed by transcribing the speech and analyzing the transcription to identify potentially sensitive data. Alternatively, such analysis may be performed on the speech in real time.

In a video data stream, sensitive or confidential information (e.g. the appearance of a patient's face or of confidential medical information relating to a patient) may be covered using a mask or removed such that the original information cannot be seen. In some examples, an algorithm may use facial recognition techniques to detect a person's face. In other examples, the position of a person of a person's face may be detected. For example, if it is determined that a video stream includes a person lying down in a horizontal position, then it may be determined that the person is patient and, therefore, that their face should be obscured in video stream. In other examples, the detection of people within a video stream may be achieved using exclusion techniques. For example, in a medical setting, if an algorithm detects that a person appearing in the video is wearing clothing other than clothing that would be expected for medical staff, then it may be determined that the detected person is likely to be a patient and, therefore, their face should be obscured in the video stream. In another example, an algorithm may use gesture recognition techniques to identify people appearing in the video stream. Positions and/or movements of people or parts of people appearing within a video stream may be analyzed to distinguish between them (e.g. to distinguish between medical staff and a patient), so that the face of the relevant person may be redacted.

In a screen-share data stream, a mask may be used to cover sensitive or confidential information (e.g. medical information relating to a patient). In some examples, an algorithm may detect a particular user interface (e.g. from a set of user interfaces), and redacted data appearing at particular locations in the user interface. For example, an algorithm may redact particular fields (e.g. name, date of birth, address, medical condition, and so on) appearing on a user interface. In other examples, an algorithm may detect information appearing within the screen-share data stream that is (or is likely to be) confidential or sensitive information. An algorithm may analyze text appearing in a screen-share data stream, and compare the text with a database of allowed words and phrases. Any text that is not "allowed" may be redacted, along with any text that is not recognized (e.g. text not included in the database of allowed words).

The plurality of algorithms may be hosted and/or managed by a management mechanism referred to as an Innovation Rack manager (IRM). The IRM, which may be hosted in the cloud or on-premise, may comprise or form part of the RTC management module 106. Some embodiments disclosed herein may implement a wrapper (e.g. which might use a public Application Programming Interface, API) that facilitates the incorporation of an independently-developed algorithm into a RTC session. In this way, newly-developed and/or newly-available algorithms may be integrated into a RTC session via the API. Further, embodiments may provide a component for hosting a set of such algorithms (e.g. a container), a component for selecting from these algorithms (e.g. REST-API or messaging services), and a component for incorporating these algorithms into a RTC session may also be provided. In general, an algorithm may be called, or added into the RTC session, using an API.

While embodiments disclosed herein relate to redacting data in a data stream transmitted as part of an RTC session, it will be appreciated that, more generally, the methods disclosed herein relate to modifying functionality of an RTC system, for example by enabling algorithms to be implemented and added to an RTC session when needed.

Figures 2, 3:
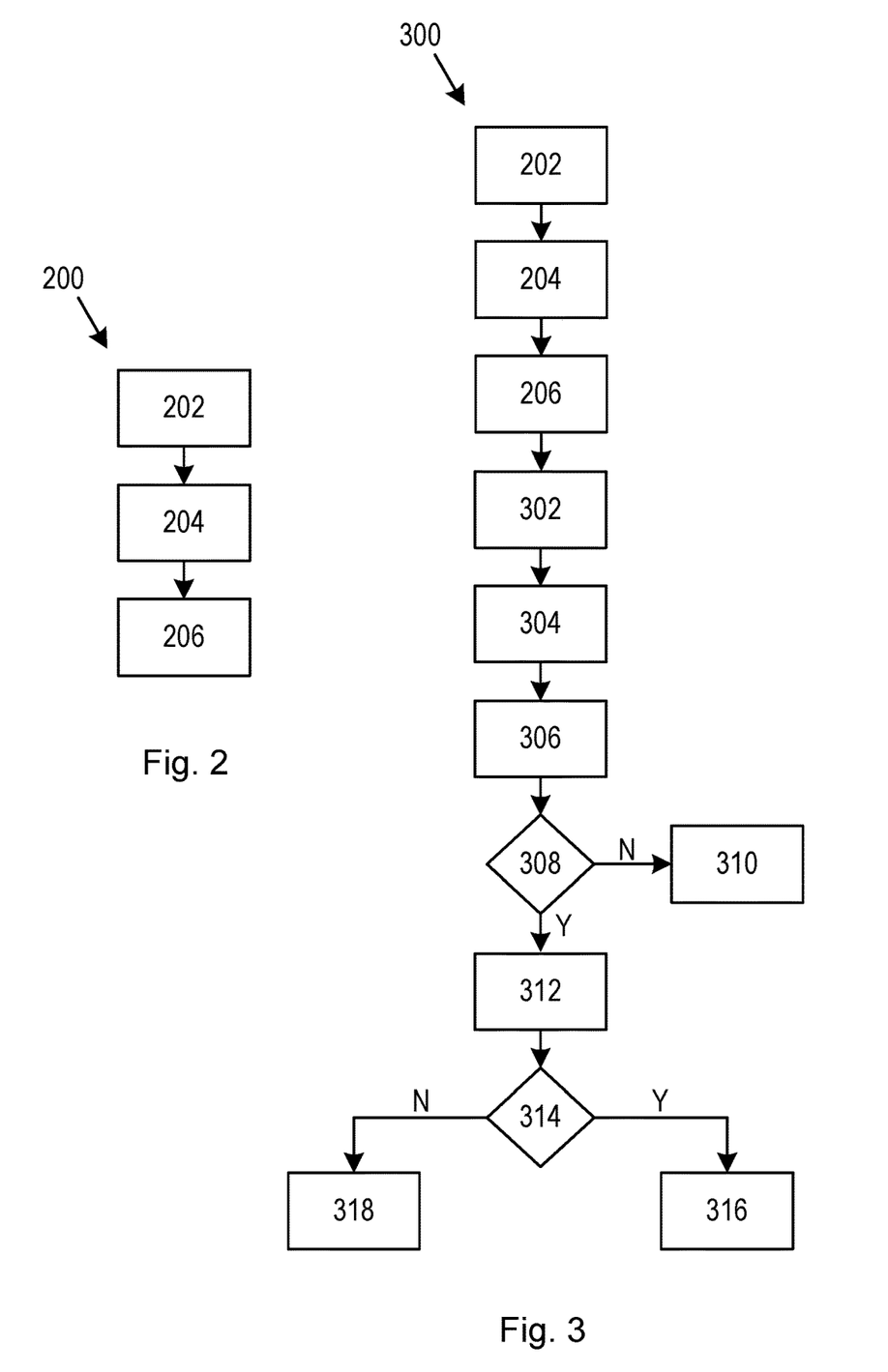
FIG. 2 is a flowchart of an example of a method for modifying functionality of an RTC system, according to various embodiments.
FIG. 3 is a flowchart of a further example of a method for modifying functionality of an RTC system, according to various embodiments.

According to a first aspect, the present invention provides a method. FIG. 2 is a flowchart of an example method 200. The method 200, which may comprise a computer-implemented method, is suitable for modifying functionality of a real-time communications system. The functionality modified may, for example, comprise functionality implemented by an algorithm, such as the redaction of data in a data stream transmitted as part of the RTC. The method 200 comprises, at step 202, establishing a real-time communication (RTC) session between a first participant (e.g. participant A) and a second participant (e.g. participant B). The established RTC session may comprise RTC session 100 of FIG. 1. At step 204, the method 200 comprises responsive to detecting a trigger event, selecting a first redaction algorithm of a plurality of redaction algorithms. As noted above, the first redaction algorithm may comprise one of a plurality of redaction algorithms stored in an algorithm management module. The plurality of redaction algorithms and the algorithm management module may be stored on a storage medium (e.g. a memory) associated with the RTC management module 106 (see FIG. 1). Thus, depending on the nature of the RTC session and/or on the nature of the participants and the data stream to be communicated between the participants, an appropriate algorithm may be selected from the plurality of redaction algorithms.

Each of the plurality of redaction algorithms may be configured to redact sensitive data or confidential patient data from the data stream to be transmitted from the first participant to the second participant during the real-time communication session. The data that is to redacted may depend on the nature of the RTC session, the nature of the participants and/or the nature of the data stream to be transmitted. In some examples, data that is considered confidential may be predefined, and a list/database of such data or data types may be stored in a storage medium accessible by the computing architecture on which the RTC session is running. For example, data may be redacted if it contains a name, address, date of birth, or personal details (e.g. medical details) relating to a person (e.g. a patient). Particular types of data may be redacted, such as data included under particular headings of a user interface (e.g. particular headings of a Digital Information and Communications in Medicine (DICOM) file). Some algorithms may be configured to redact image, video or screen-share data which shows particular content (e.g. a face of a person, such as a patient, or text or writing containing confidential information). Any such data may, according to some examples, be referred to as sensitive data.

The trigger event that causes the selection of the algorithm to be made may be one of a defined set of events. In some embodiments, the act of establishing an RTC session itself may serve as a trigger to select a redaction algorithm. This may be appropriate, for example, when it is likely that sensitive or confidential information may be present in any data stream communicated during an RTC session. In other embodiments, an act performed by one of the participants of the RTC session may serve as a trigger event. For example, if participant A were to indicate an intention to start a screen-share session, which could include sensitive data, then providing such an indication may constitute a trigger event. In other examples, the presence or appearance of a particular type of data (e.g. the detection of a particular person's voice or the detection of a particular word or phrase in an audio data stream, the appearance of a particular setting or room in a video data stream, or the appearance of a particular user interface for computer application in a screen-share data stream) may serve as a trigger event leading to the redaction algorithm selection of step 204. Contextual information (discussed in greater detail below) relating to a context of the data stream may be extracted and used to determine whether (and when) an algorithm should be called and used. Thus, contextual information may be used to determine an event to serve as a trigger event. More generally, the trigger event may comprise an event selected from a set of events comprising: detecting the performance of a defined action; detecting the initiation of an RTC session; detecting the initiation of a defined type of data stream sharing; and detecting a defined type of data in a data stream to be transmitted as part of the RTC session.

At step 206, the method 200 comprises adding the first redaction algorithm to the real time communication session as a virtual participant. As discussed above with reference to FIG. 1, the selected algorithm may be added to the RTC session by an RTC management module 106. In general, however, the addition of the selected algorithm to the RTC session may be controlled and effected by the processor(s) and associated computer program/application that implements the RTC session. In this disclosure, the expression "virtual participant" is intended to refer to a participant that is capable of communicating with other participants of the RTC session, but which is generated and controlled by a computing device (e.g. rather than by a human).

The first redaction algorithm is configured to redact data appearing in a data stream to be transmitted from the first participant to the second participant during the real time communication session. As noted above, the type and amount of redaction performed by the first redaction algorithm depends on various factors. In some examples, the first redaction algorithm may be configured to operate (e.g. perform its redaction function) in real time, such that the second participant (e.g. participant B), to whom the data stream is to be transmitted, experiences minimal delay or latency. In some examples, however, the time required for the redaction algorithm to perform the redaction of the data stream may lead to a short delay (e.g. of 1 to 2 seconds).

By implementing the redaction algorithm in this way (i.e. by adding the redaction algorithm a participant of the RTC session), participants are able to take part in a real-time communication session with the confidence that any sensitive or confidential information that should not be transmitted to one of the participants will be identified and redacted. Thus, in an example where a medical professional establishes an RTC session with a remote support agent to obtain technical support regarding a piece of medical equipment being used during a medical procedure, the medical professional is able to quickly obtain the necessary technical support while remaining in the presence of the patient, and the medical professional does not need to concern himself or herself with hiding any medical information relating to the patient, as such information will be identified and removed by the selected redaction algorithm, as part of the method 200.

As noted previously, embodiments of the methods disclosed herein may be implemented within a clinical setting. Thus, according to some embodiments, the first participant may comprise a medical professional, or a computing device operated by a medical professional. The real-time communication may be configured for exchange of information relating to medical device support. As described in the above example, a medical professional may require technical assistance in relation to a medical device. In some examples, the real-time communication may be configured for exchange of clinical information relating to clinical decision support. For example, the medical professional may require input or advice regarding diagnosis or treatment of a patient. Using an RTC session according to embodiments disclosed herein enables the medical professional to discuss the patient being treated, while having the confidence that any confidential information will be redacted. The real-time communication may be configured for exchange of information relating to computer application support. For example, a medical professional operating a computer application may require support relating to its usage, and the RTC session may enable such support to be obtained without risk of breaching the confidentiality of a patient.

It will be appreciated that the precise data that is redacted by the algorithm may depend on the algorithm itself and on parameters which may be adjusted on a case by case basis. For example, in a scenario where a medical professional is communication with a software support agent or computer application support agent using an RTC session in accordance with methods disclosed herein, it may be important that no medical details are disclosed to the support agent and, therefore, all such medical details are to be redacted. Thus, an algorithm may be called which is capable of redacting any (or particular types of) medical information disclosed during the RTC session. However, during an RTC session with a second medical professional to exchange clinical information relating to clinical decision support, the medical professional seeking support may need to disclose some medical details and, therefore, an algorithm may be called which is suitable for redacting appropriate information (e.g. patient-identifying data).

FIG. 3 is a flowchart of a further example of a method 300. The method 300 may comprise a computer implemented method, and may be considered to be suitable for modifying functionality of a real-time communications system. The method 300 may be suitable for redacting data in a real-time communications system. The method 300 may comprise steps of the method 200 discussed above. At step 302, the method 300 may comprise, responsive to adding the first redaction algorithm to the real time communication session, transmitting the data stream to the first redaction algorithm. The data stream may, for example, be transmitted to the first redaction algorithm via the data exchange 114 (see FIG. 1). The method 300 may comprise, at step 304, redacting data in the data stream. The data that is to be redacted on the data stream depends on the nature of the first redaction algorithm and on the data included in the data stream. Generally, the data that is redacted at step 304 comprises data that is not to be disclosed or shared with one of the participants of the RTC session, such as confidential or sensitive data, or data that may be used to identify an individual. At step 306, the method 300 may comprise transmitting a redacted data stream to the second participant. The redacted data stream comprises the original data stream (i.e. data stream to be transmitted from the first participant to the second participant) with certain data (i.e. data that is not to be transmitted to the second participant) having been redacted.

Redaction of a data stream using the first redaction algorithm may, in some cases, continued for the duration of the RTC session. In some examples, however, it may not be necessary to maintain redaction of the data stream. For example, at some point during the transmission of the data stream, it may become apparent that no sensitive data is being transmitted, or is to be transmitted and, therefore, it may no longer be necessary to apply the first redaction algorithm to the data stream. A decision regarding whether or not redaction of the data stream is to continue may be made after a defined duration, or periodically, for example every second or every few seconds. Alternatively, such a decision may be made in response to an indication, such as an indication made by one of the participants of the RTC session. Thus, the method 300 may comprise, at step 308, determining, after a defined duration or in response to an indication, whether redaction of the data stream is to be continued. If it is determined at step 308 that redaction of the data stream is not to be continued (e.g. if transmission of the data stream has ended, or if some other factor results in the decision not to continue redacting the data stream), then redaction of the data stream may be stopped or ended. Thus, responsive to determining that redaction of the data stream is not to be continued, the method 300 may comprise removing the first algorithm as a virtual participant to the real time communication session, such that the data stream is transmitted directly from the first participant the second participant. In other words, if further redaction of the data stream is not required, then the data stream is no longer transmitted via the first algorithm (participant C in the example of FIG. 1).

Depending on the type of data stream being transmitted to and redacted by the redaction algorithm 112, it may be necessary to continually or repeatedly analyze the data stream currently being transmitted or about to be transmitted, to determine whether or not it contains any data that is to be redacted. In the case of a screen-share data stream, there may be relatively little change in the appearance of the screen being shared from frame to frame, or over the duration of the RTC session. In some cases, once a suitable redaction mask (e.g. an opaque region or block for covering or obfuscating a portion of a screen-share or a video) has been generated, it may be possible to use that same mask for a period of time, without regenerating it. For example, if a particular user interface displayed in a screen-share data stream includes a region in which a patient's personal medical data is displayed in the upper left corner, then, once a mask has been generated to overlay that region, it may not be necessary to generate a new mask, as the same mask may be suitable for use with that screen-share data stream, provided the user interface being displayed does not change. Thus, in some embodiments, if the data stream remains unchanged, or changes by less than a defined threshold amount, for a particular duration, then the first redaction algorithm may not be required. Rather, the mask generated previously by the first redaction algorithm may be used and applied to the data stream. In such cases, the data stream may be transmitted directly from the first participant (e.g. participant A) to the second participant (e.g. participant B) without being transmitted via the first redaction algorithm. Instead, the previously-generated mask is applied to the data stream before it arrives at the second participant.

With reference again to FIG. 3, the method 300 may comprise, at step 312, determining an amount by which content in the data stream changes within a defined duration. The defined duration may, for example, comprise a defined time period, such as 0.5 seconds, 1 second or 2 seconds, or a defined number of frames of a video data stream, such as 5 frames, 10 frames or 20 frames. The amount by which content has changed may be measured in various ways. In one example, the amount of change in the data stream may be measured in terms of a number or proportion of pixels that have changed during the defined duration. For example, if it is determined that 10% of the pixels shown in a screen-share data stream have changed in 0.5 seconds, then this may be considered sufficient to continue redacting the data stream using the first redaction algorithm. Thus, at step 314, the method 300 may determine whether or not the content in the data stream has changed by at least a defined threshold. Responsive to determining that the content in the data stream has changed by at least a defined threshold amount within the defined duration, the method 300 may comprise, at step 316, continuing to redact the data stream using the first redaction algorithm. In other words, if the data stream is determined to be changing regularly (e.g. continuous speech in an audio data stream, regular movement in a video data stream or repeated changes of content or data are displayed in a screen-share data stream) then the data stream is transmitted via the first redaction algorithm 112 so that the redaction algorithm can continue to analyze the data stream and ensure that any sensitive data is redacted. However, responsive to determining that the content in the data stream has changed by less than the defined threshold amount within the defined duration, the method 300 may comprise, at step 318, transmitting the data stream directly from the first participant to the second participant, and transmitting a redaction mask from the first algorithm to the second participant. In this scenario, the redaction mask that has been generated by the first redaction algorithm is considered suitable for the data stream (providing the data stream content does not change significantly), so is applied to the data stream as it is sent directly from the first participant to the second participant. The application of the redaction mask may be performed using a computer application or program operating on the computing device of the second participant of the second participant. In some embodiments, the computer application implementing the RTC session may apply the redaction mask to the data stream.

By applying a redaction mask to the data stream when it is transmitted directly from the first participant to the second participant, data transmission speeds may be improved, compared to the case where the data stream is transmitted via the first redaction algorithm. As a result, the second participant may experience reduced latency or less lag in the arrival of the data stream from the first participant.

Figure 4:
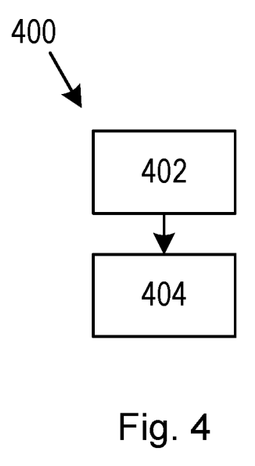
FIG. 4 is a flowchart of a further example of a method for modifying functionality of an RTC system, according to various embodiments.

As noted previously, multiple algorithms may be called and implemented concurrently or sequentially, and used to redact data from one or more data streams being transmitted during an RTC session. Multiple algorithms may be selected and added as virtual participants in the RTC session at the same time. In other examples, however, individual redaction algorithms may be added in response to separate trigger events being detected. FIG. 4 is a flowchart of a further example of a method 400. The method 400 may take place once an RTC session has been established (for example at step 202 of FIG. 2). For example, the method 400 may take place concurrently with step 204 and 206, or after steps 204 and 206 have taken place. The method 400 may comprise, at step 402, responsive to detecting a further trigger event, selecting a second redaction algorithm of the plurality of redaction algorithms. At step 404, the method 400 may comprise adding the second redaction algorithm to the real time communication session of a virtual participant. The second redaction algorithm may be added in series with the first redaction algorithm, such that a data stream to be transmitted by the first participant is transmitted to the first redaction algorithm, and then to the second redaction algorithm, before being transmitted to the second participant. Alternatively, the second redaction algorithm may be added in parallel with the first redaction algorithm, such that a data stream may be transmitted to just one or the other of the first and second redaction algorithms, or to both redaction algorithms individually. The second redaction algorithm is configured to redact data appearing in the data stream during the real time communication session. Thus, the second redaction algorithm may be configured to redact a different type of data than the first redaction algorithm, or it may be configured to perform a different redaction technique to the first redaction algorithm.

In some embodiments, information or data included in the data stream that is transmitted (or is to be transmitted) as part of the RTC session may be extracted and/or analyzed in order to gain an understanding (e.g. more information) about the nature of the RTC session. Such information may relate to or provide an insight into the context of the RTC session, and may be used to determine the type of data to be redacted from the data stream. For example, it may be recognized in a video data stream that a medical professional (e.g. who has initiated the RTC session) is standing near to a surgical bed on which a patient is lying. It may also be recognized that other people in the scene are medical professionals. Thus, from this contextual information, a processor (e.g. the processor executing the RTC session) may deduce a context of the RTC session—in this example, it may be determined that the medical professional is involved in a medical procedure (e.g. surgery), and that the person lying on the surgical bed is a patient whose identity is to be kept confidential. Thus, based on the contextual information, a determination of the data to be redacted may be made. In some embodiments, the contextual data may be used to determine which algorithm is to be called or used for redacting data. The contextual information may be used to determine a second algorithm to be selected and called, following the selection of the first algorithm.

Figure 5:
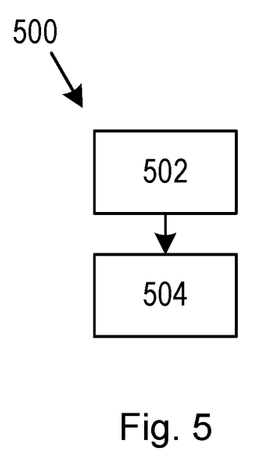
FIG. 5 is a flowchart of a further example of a method for modifying functionality of an RTC system, according to various embodiments.

The use of contextual information is discussed further with reference to FIG. 5. FIG. 5 is a flowchart of a further example of a method 500. The method 500 may take place once an RTC session has been established (for example at step 202 of FIG. 2). For example, the method 400 may take place concurrently with step 204 and 206, or after steps 204 and 206 have taken place. The method 500 may comprise, at step 502, extracting, from the data stream, contextual information relating to the nature of the real-time communication session. At step 504, the method 500 may comprise determining, based on the extracted contextual information, data to be redacted from the data stream. In some embodiments, determining data to be redacted from the data stream may comprise predicting, based on the extracted contextual information, the occurrence of an event during the real-time communication session that will contain data that is to be redacted. As noted above, in a video data stream, the context may be understood from objects appearing in the video, which may be detected using object detection and recognition techniques, facial recognition techniques, and the like. Based on the context of the video (e.g. the setting or location), it may be predicted that certain data is likely to appear or be disclosed, and therefore an appropriate redaction algorithm can be called and used. In audio data streams, (e.g. natural language processing (NLP)) techniques may be used to detect words or phrases that might indicate that personal information is about to be disclosed. For example, if the phrase "the patient's name is" is detected in an audio data stream, it might be expected that the next word or phrase will be the patient's name. Therefore, appropriate redaction of the name can be ensured. In a screen-share data stream, information provided in the screen-share may be used to understand the context of the RTC session, for example to understand what the RTC session is about and, therefore, the types of data that might be disclosed that should be redacted. In general, obtaining and using contextual information from the RTC session improves the effectiveness of the redaction techniques disclosed herein.

Figure 6:
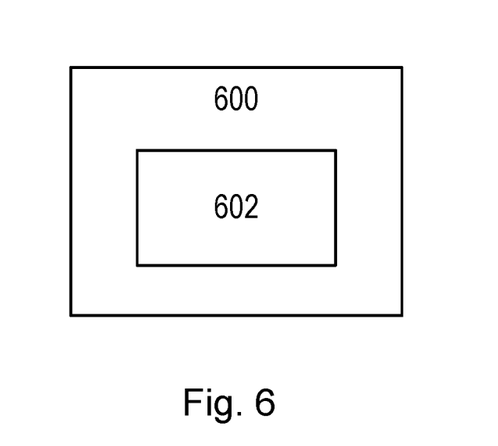
FIG. 6 is a schematic illustration of an example of an apparatus for modifying functionality of an RTC system according to various embodiments.

According to a second aspect, the present invention provides an apparatus. FIG. 6 is a schematic illustration of an example apparatus 600. The apparatus 600 is suitable for modifying functionality of a real-time communications system. The apparatus 600 comprises a processor 602. The processor 602 is configured to detect a trigger event associated with a data stream to be transmitted from a first participant of a real-time communication session between to a second participant of the real-time communication session. The processor 602 is further configured, responsive to detecting the trigger event, to initiate a first redaction algorithm The processor 602 is further configured receive the data stream from the first participant. The processor 602 is further configured apply the first redaction algorithm to redact a portion of data appearing in the received data stream. The processor 602 is further configured to transmit a redacted data stream to the second participant. In general, the processor 602 may be configured to perform steps of the methods 300, 400, 500 described above.

The apparatus 600 may comprise or form part of a computing device, such as a desktop computer, a server, or the like. In some embodiments, the processor 602 may also run or execute software to implement the RTC session. The apparatus 600 may comprise or be in communication with an algorithm management module, and algorithm storage module and/or the RTC management module 106, as described above. More generally, the apparatus 600 may comprise or be in communication with a storage device (e.g. a memory) that stored the plurality of algorithms from which the first, second and other algorithms may be selected and added to the RTC session as required. In some embodiment, the apparatus may comprise a communications module or communications unit (not shown) to enable communications to be made with participants of the RTC session.

In some embodiments, the processor 602 may be further configured to determine an amount by which content in the data stream changes within a defined duration. The processor 602 may respond differently depending on whether or not (or the amount by which) content in the data stream is determined to have changed. The processor 602 may be configured, responsive to determining that the content in the data stream has changed by at least a defined threshold amount within the defined duration, to continue to apply the first redaction algorithm to redact a portion of data appearing in the data stream. Thus, if content in the data stream is changing regularly, then there is a greater likelihood that confidential or sensitive data may appear or be disclosed in the data stream and, therefore, the first redaction algorithm is maintained as a party to the RTC session, to continue to redact data as required from the data stream. However, the processor 602 may be configured, responsive to determining that the content in the data stream has changed by less than the defined threshold amount within the defined duration, to stop receiving the data stream from the first participant, and to transmit a redaction mask to the second participant to be applied to the data stream. For example, if a screen-share data stream continues unchanged for a period of time (e.g. more than a second), then a previously-generated mask may be sufficient for covering or obscuring any sensitive data in the screen-share data stream. Thus, rather than continue to use the first redaction algorithm to redact data in the data stream, the processor 602 may transmit the redaction mask (or data defining the redaction mask) to the second participant of the RTC session. The data stream may then be transmitted directly from the first participant to the second participant, and the redaction mask is applied to the data stream at the second participant, using appropriate software. If it is detected that the data stream content has changed by more than the threshold amount at some later time, then the data stream may again be sent form the first participant to the first algorithm, for data to be redacted before being transmitted to the second participant.

Figure 7:
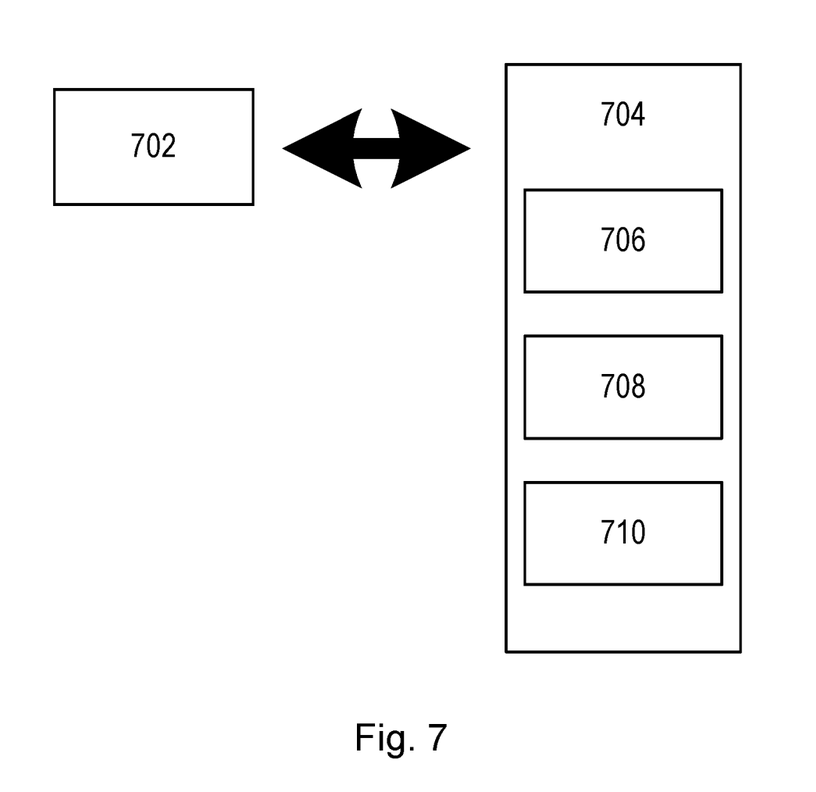
FIG. 7 is a schematic illustration of a computer-readable medium in communication with a processor.

According to a third aspect, the present invention provides a computer program product. According to various embodiments, a computer program product comprises a non-transitory computer-readable medium. FIG. 7 is a schematic illustration of an example of a computer-readable medium 704 in communication with a processor 702. The processor 702 may comprise or be similar to the processor 602 discussed above. The computer-readable medium 704 has computer-readable code embodied therein. The computer readable code is configured such that, on execution by a suitable computer or processor 702, the computer or processor is caused to perform steps of the methods 300, 400, 500 disclosed herein. For example, the computer-readable medium 704 may comprise RTC session establishing code 706 which, when executed by the processor 702, causes the processor to establish a real-time communication session between a first participant and a second participant. The computer-readable medium 704 may comprise redaction algorithm selecting code 708 which, when executed by the processor 702, causes the processor, responsive to detecting a trigger event, to select a first redaction algorithm of a plurality of redaction algorithms. The computer-readable medium 704 may comprise redaction algorithm adding code 710 which, when executed by the processor 702, causes the processor to add the first redaction algorithm to the real-time communication session as a virtual participant. The first redaction algorithm may be configured to redact data appearing in a data stream to be transmitted from the first participant to the second participant during the real-time communication session.

The processor 602, 702 can comprise one or more processors, processing units, multi-core processors or modules that are configured or programmed to control the apparatus 600 in the manner described herein. In particular implementations, the processor 602, 702 can comprise a plurality of modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method comprising:
   establishing a real-time video streaming session between a first participant and a second participant;
   responsive to detecting a trigger event, selecting a first redaction algorithm of a plurality of redaction algorithms; and
   adding the first redaction algorithm to the real-time video streaming session as a virtual participant;
   wherein the first redaction algorithm is configured to redact image data appearing in a data stream to be transmitted from the first participant to the second participant during the real-time video streaming session,
   wherein the video streaming session comprises a display screen-sharing data stream,
   wherein the first redaction algorithm is configured to apply image processing techniques to the data stream to identify the image data that is to be redacted, and
   wherein the first redaction algorithm is configured to distinguish between medical personnel and non-medical personnel, and to redact some or all of the image data associated with the non-medical personnel.

2. The method according to claim 1, further comprising:
   responsive to adding the first redaction algorithm to the real-time video streaming session, transmitting the data stream to the first redaction algorithm;
   redacting image data in the data stream; and
   transmitting a redacted data stream to the second participant.

3. The method according to claim 2, further comprising:
   determining, after a defined duration or in response to an indication, whether redaction of the data stream is to be continued; and
   responsive to determining that redaction of the data stream is not to be continued, removing the first algorithm as a virtual participant to the real-time video streaming session, such that the data stream is transmitted directly from the first participant to the second participant.

4. The method according to claim 2, further comprising:
   determining an amount by which content in the data stream changes within a defined duration; and
   responsive to determining that the content in the data stream has changed by at least a defined threshold amount within the defined duration, continuing to redact the data stream using the first redaction algorithm.

5. The method according to claim 1, wherein each of the plurality of redaction algorithms is configured to redact sensitive image data related to a patient from the data stream to be transmitted from the first participant to the second participant during the real-time video streaming session.

6. The method according to claim 1, wherein the trigger event comprises an event selected from a set of events comprising: detecting the performance of a defined action; detecting the initiation of the real-time video streaming session; detecting the initiation of a defined type of data stream sharing; and detecting a defined type of data in a data stream to be transmitted as part of the real-time video streaming session.

7. The method according to claim 1, further comprising:
   extracting, from the data stream, contextual information relating to the nature of the real-time video streaming session; and determining, based on the extracted contextual information, the image data to be redacted from the data stream.

8. The method according to claim 7, wherein determining data to be redacted from the data stream comprises predicting, based on the extracted contextual information, the occurrence of an event during the real-time video streaming session that will contain the image data that is to be redacted.

9. The method of claim 1, wherein the first redaction algorithm is configured and to redact facial image data associated with the non-medical personnel.

10. A method for modifying functionality of a real-time communications system, the method comprising:
  establishing a real-time communication session between a first participant and a second participant;
  responsive to detecting a trigger event, selecting a first redaction algorithm of a plurality of redaction algorithms; and
  adding the first redaction algorithm to the real-time communication session as a virtual participant;
    wherein the first redaction algorithm is configured to redact data appearing in a data stream to be transmitted from the first participant to the second participant during the real-time communication session;
  responsive to adding the first redaction algorithm to the real-time communication session, transmitting the data stream to the first redaction algorithm;
  redacting data in the data stream; and
  transmitting a redacted data stream to the second participant,
  determining an amount by which content in the data stream changes within a defined duration; and
  responsive to determining that the content in the data stream has changed by less than the defined threshold amount within the defined duration, transmitting the data stream directly from the first participant to the second participant, and transmitting a redaction mask from the first algorithm to the second participant.

11. The method according to claim 10, wherein the data stream comprises at least one of an audio data stream, a video data stream, a textual data stream and a display screen-sharing data stream.

12. A method for modifying functionality of a real-time communications system, the method comprising:
  establishing a real-time communication session between a first participant and a second participant;
  responsive to detecting a trigger event, selecting a first redaction algorithm of a plurality of redaction algorithms; and
  adding the first redaction algorithm to the real-time communication session as a virtual participant;
    wherein the first redaction algorithm is configured to redact data appearing in a data stream to be transmitted from the first participant to the second participant during the real-time communication session;
    wherein the video streaming session comprises a display screen-sharing data stream;
    wherein the first redaction algorithm is configured to apply image processing techniques to the data stream to identify the image data that is to be redacted; and
    wherein the first redaction algorithm is configured to distinguish between medical personnel and non-medical personnel, and to redact some or all of the image data associated with the non-medical personnel;
  responsive to detecting a further trigger event during the real-time communication session, selecting a second redaction algorithm of the plurality of redaction algorithms; and
  adding the second redaction algorithm to the real-time communication session as a virtual participant;
    wherein the second redaction algorithm is configured to redact data appearing in the data stream during the real-time communication session.

13. A method for modifying functionality of a real-time communications system, the method comprising:
  establishing a real-time communication session between a first participant and a second participant;
  responsive to detecting a trigger event, selecting a first redaction algorithm of a plurality of redaction algorithms; and
  adding the first redaction algorithm to the real-time communication session as a virtual participant;
    wherein the first redaction algorithm is configured to redact data appearing in a data stream to be transmitted from the first participant to the second participant during the real-time communication session;
    wherein the first redaction algorithm is one of a plurality of redaction algorithms stored in an algorithm management module;
    wherein the video streaming session comprises a display screen-sharing data stream;
    wherein the first redaction algorithm is configured to apply image processing techniques to the data stream to identify the image data that is to be redacted; and
    wherein the first redaction algorithm is configured to distinguish between medical personnel and non-medical personnel, and to redact some or all of the image data associated with the non-medical personnel.

14. A computer program product comprising a non-transitory computer-readable medium, the computer-readable medium having computer-readable code embodied therein, the computer-readable code being configured such that, on execution by a suitable computer or processor, the computer or processor is caused to perform the method of claim 1.

15. An apparatus comprising:
  a processor configured to:
    detect a trigger event associated with a data stream to be transmitted from a first participant of a real-time video streaming session to a second participant of the real-time video streaming session;
    responsive to detecting the trigger event, initiate a first redaction algorithm;
    receive the data stream from the first participant;
    apply the first redaction algorithm to redact a portion of data appearing in the received data stream; and
    transmit a redacted data stream to the second participant;
      wherein the video streaming session comprises a display screen-sharing data stream;
      wherein the first redaction algorithm is configured to apply image processing techniques to the data stream to identify the image data that is to be redacted; and
      wherein the first redaction algorithm is configured to distinguish between medical personnel and non-medical personnel, and to redact some or all of the image data associated with the non-medical personnel.

16. An apparatus for modifying functionality of a real-time communications system, the apparatus comprising:
a processor configured to:
- detect a trigger event associated with a data stream to be transmitted from a first participant of a real-time communication session to a second participant of the real-time communication session;
- responsive to detecting the trigger event, initiate a first redaction algorithm;
- receive the data stream from the first participant;
- apply the first redaction algorithm to redact a portion of data appearing in the received data stream;
- transmit a redacted data stream to the second participant;
- determine an amount by which content in the data stream changes within a defined duration;
- responsive to determining that the content in the data stream has changed by at least a defined threshold amount within the defined duration, continue to apply the first redaction algorithm to redact a portion of data appearing in the data stream; and
- responsive to determining that the content in the data stream has changed by less than the defined threshold amount within the defined duration, stop receiving the data stream from the first participant, and transmit a redaction mask to the second participant to be applied to the data stream.

* * * * *